April 13, 1943.   A. W. WOODWARD   2,316,642
WHEEL ASSEMBLY
Filed Oct. 28, 1941
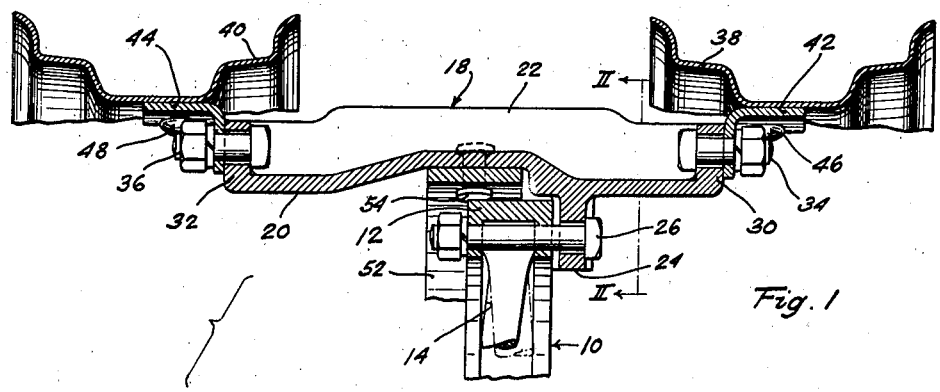
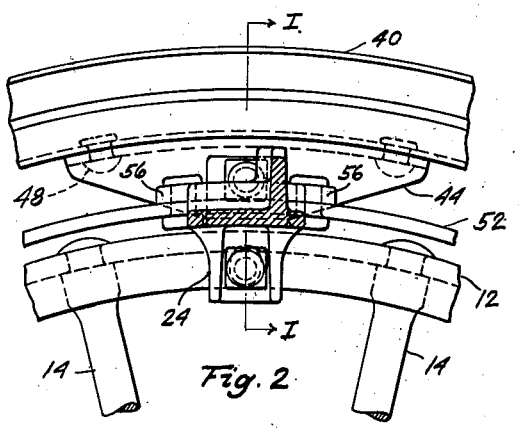
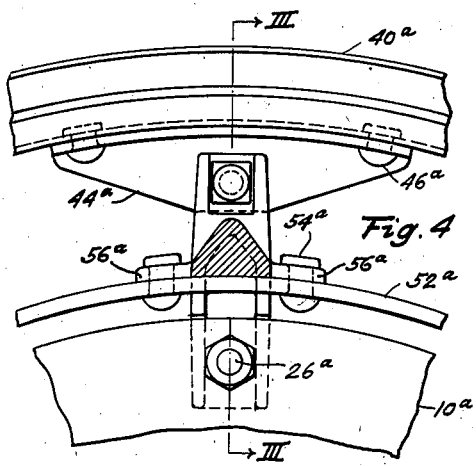
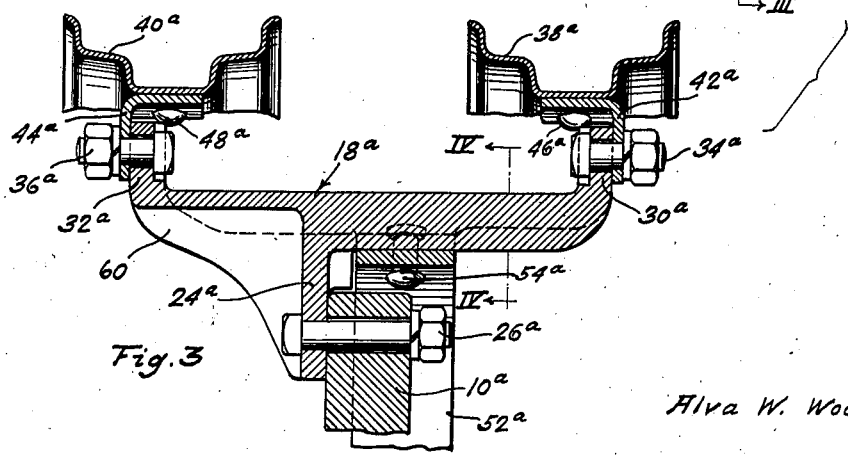
Inventor
Alva W. Woodward
By
Attorney Patented Apr. 13, 1943

2,316,642

UNITED STATES PATENT OFFICE 2,316,642

WHEEL ASSEMBLY

Alva W. Woodward, Kent, Ohio, assignor to Wingfoot Corporation, Wilmington, Del., a corporation of Delaware Application October 28, 1941, Serial No. 416,840

6 Claims. (Cl. 301—13)

This invention relates to wheel assemblies, and more particularly, is concerned with wheel assemblies in which a rim or a pair of rims are mounted on a wheel by a plurality of circumferentially spaced brackets.

Heretofore, various wheel assemblies have been employed in which a rim or a pair of rims are secured to a wheel by a plurality of circumferentially spaced brackets. However, in assemblies of this type it is often difficult to properly position and align the brackets with lugs carried by the rim or rims and it has also been difficult to properly align the brackets with bolt receiving holes positioned in the wheel or wheel felloe. Further, the individual brackets are apt to be scattered, misplaced, or lost, and some difficulty may be experienced in positioning each bracket in exactly the same relation between the wheel and rim or rims as every other bracket. Again, wheel assemblies of the type wherein circumferentially spaced brackets are employed to mount a rim or a pair of rims on a wheel have often been open to the objection that the complete wheel assembly is relatively weak unless the size or weight of the parts are increased to an objectionable degree.

It is the general object of my invention to avoid and overcome the foregoing and other difficulties adherent to known wheel structures by the provision of an improved wheel assembly wherein a plurality of brackets adapted to mount a rim or rims on a wheel are secured together by an endless band which accurately positions, aligns, and supports the brackets.

Another object of my invention is the provision of a dual wheel assembly wherein a plurality of circumferentially spaced and circularly positioned brackets are employed to releasably secure a pair of rims in any one of a plurality of positions on a wheel so that the spacing between the rims or the tread width of a vehicle on which the rims are mounted may be as desired within reasonably wide limits.

Another object of my invention is the provision of mounting brackets carried in accurately aligned and related positions with respect to each other and capable of being mounted on either the inboard or the outboard side of a wheel and including means to which a rim or a pair of rims can be secured either in inboard or outboard relation and extending in either inboard or outboard directions.

Another object of my invention is to provide a wheel assembly of the type wherein a rim or a pair of rims is mounted upon a wheel by a plurality of circumferentially spaced brackets and in which the strength, ruggedness, and life of the assembly is improved over that heretofore known, and without objectionably increasing the weight or size of the parts.

The foregoing and other objects of my invention are achieved by the provision of a wheel and rim assembly including a wheel, a plurality of brackets, means removably securing the brackets to the wheel at circumferentially spaced points, an endless band positioned concentrically of the wheel and secured to the brackets, and a rim or a pair of rims mounted on and carried by the brackets.

For a better understanding of my invention reference should be had to the accompanying drawing wherein:

Fig. 1 is a transverse cross-sectional view (taken substantially on line I—I of Fig. 2) and illustrating one embodiment of my invention;

Fig. 2 is a cross-sectional view taken on line II—II of Fig. 1;

Fig. 3 is a view similar to Fig. 1 (and taken substantially on line III—III of Fig. 4) but illustrating a modification of my invention; and Fig. 4 is a cross-sectional view taken on line IV—IV of Fig. 3.

Although the principles of my invention are broadly applicable to any wheel assembly wherein a rim or rims are mounted on a wheel by a plurality of brackets, the invention is primarily concerned with the mounting of a pair of rims on a wheel and has accordingly been so illustrated and will be so described, although it should be specifically understood that I am not to be limited to a dual wheel assembly.

In Fig. 1 the numeral 10 indicates a wheel having a felloe 12 and felloe supporting spokes 14 immovably secured to the felloe 12. At a plurality of circumferentially spaced points are brackets, shown generally at 18, only one of which has been illustrated inasmuch as the complete wheel assembly will be understood from the drawing. Each bracket 18 includes a base portion 20 and an upstanding side flange 22 so that the bracket has substantially an L shape in cross-section as best seen in Fig. 2. Integrally formed with, or if desired secured to the bracket 18, is a radially inwardly extending flange 24 which is adapted to be secured to either side of the wheel felloe 12 as by a bolt 26. The flange 24 is positioned off-center of the bracket 18 so that by reversing the bracket end for end the lateral position of the bracket with respect to the wheel felloe is changed. In other words, the inboard or outboard relationship of the bracket with respect to the plane of the wheel felloe is altered. Thus, each bracket 18 can be mounted in four positions relative to the wheel 10, namely, (1) in the position shown in Fig. 1, (2) with the bracket 18 as shown in Fig. 1 but with the flange 24 moved to the left hand side of the wheel felloe 12, (3) with the bracket 18 turned end for end from the position shown in Fig. 1 and with the flange 24 mounted on the right hand side of the wheel felloe 12, and (4) with the bracket 18 turned end for end from the position shown in Fig. 1 and with the flange 24 mounted on the left hand side of the wheel felloe 12.

Each bracket 18 is provided with suitable means adjacent its ends which facilitate the readily releasable mounting of a rim or a pair of rims on the brackets. To this end, integrally radially outwardly directed flanges 30 and 32 may be formed on the ends of the brackets 18, and the flanges are suitably apertured to receive bolts 34 and 36. A pair of rims 38 and 40, which may be of any desired or suitable type, for example, drop center rims as shown, are adapted to be secured to the brackets 18 by the bolts 34 and 36. This is conveniently accomplished by securing lug means to the inner peripheries of the rims 38 and 40, and such lug means may comprise a plurality of lugs 42 and 44 secured respectively to the rims 38 and 40 at circumferentially spaced points by rivets 46 and 48 or by other known means. The lugs 42 and 44 have radially inwardly directed portions which are suitably apertured to receive bolts 34 and 36 respectively and with the radially inwardly directed lug portions adapted to engage laterally with the radially outwardly directed flanges 30 and 32 of the bracket. The lugs 42 and 44 are generally positioned to one side of the central plane of each rim so that the rims can each be mounted on the brackets 30 and 32 so as to extend either inboard or outboard.

Thus, the spacing between the rims 38 and 40 can be altered by altering the position of the rims on the brackets, and the overall tread width of the complete wheel assembly with respect to another wheel assembly when mounted on a vehicle can be altered by changing the position of the rims on the brackets or by changing the position of the brackets on the wheel or by a combination of these adjustments. It might be noted, before leaving the description of the adjustable mounting of each rim on the brackets 18 that I may eliminate the side flange 22 on each bracket 18 which will permit the radially inwardly directed portions of the lugs 42 and 44 to be positioned on the inner or wheel sides of the radially outwardly directed flanges 30 and 32 of the brackets 18 by first turning each rim relative to the wheel with the brackets supported thereon, moving the wheel and rim axially toward each other, and then turning the rim or rims back toward their original position. In other words, a sort of bayonet joint type of movement is necessary to position the rim lugs to the wheel side of the radially outwardly directed flanges 30 and 32 of the brackets 18.

An important part of my inventive concept is to secure the plurality of brackets 18 together so that the brackets are accurately aligned and positioned relative to each other. This is achieved in the embodiment of my invention illustrated by the provision of an endless band 52 which is positioned concentrically of the wheel felloe 12 and which is secured in any suitable manner to the brackets 18. Conveniently the endless band 52 is secured to brackets 18 by rivets 54 which extend through the endless band and through suitable arcuate ears 56 usually formed integrally with the brackets 18. The brackets 18 may have their bottom portions 20 indented as best seen in Fig. 1 so as to receive the endless band 52.

The modification of my invention illustrated in Figs. 3 and 4 is generally similar to that already described in detail above and illustrated in Figs. 1 and 2. Specifically, a plurality of brackets 18a are adapted to be releasably secured as by bolt means 26a to one side or the other of a wheel 10a. The radially inwardly directed flange 24a, usually formed integrally with the bracket 18a may include strengthening webs 60 which increase the strength of the flanges 24a but which prevent the bracket from being mounted in four positions on the wheel 10a. Thus, in the form of my invention shown in Figs. 3 and 4 the brackets 18a can be mounted only in two positions with respect to the wheel 10a, namely, the position shown in Fig. 3, and a position in which the bracket 18a is reversed end for end and positioned on the other side of the wheel. Each bracket 18a has integrally radially outwardly extending flanges 30a and 32a to which are releasably secured lugs 42a and 44a as, for example, by bolts 34a and 36a. The lugs 42a and 44a are secured to rims 38a and 40a in any desired manner. Each one of the rims 38a and 40a can be mounted in any one of four positions with respect to its associated bracket flange, which positions will be evident from the description set forth above.

The several brackets 18a are secured together in circumferentially spaced relation by an endless band 52a, and the brackets may be secured thereto in any known manner, as for example by rivets 54a which extend through arcuate lugs 56a generally formed integrally with the bracket 18a.

From the foregoing it will be recognized that the objects of my invention have been achieved by the provision of an improved wheel assembly in which a plurality of brackets are adapted to releasably secure one or more rims in any one of a plurality of positions on a wheel. The brackets are held at all times in circular relation to each other and at circumferentially spaced and accurately aligned positions. The mounting of the rims on the wheel is facilitated, brackets are not lost or mislaid, and the complete wheel assembly is materially strengthened and improved.

In the drawing I have specifically illustrated wheel assemblies having continuous felloe portions. However, many wheels employed today to mount one or more rims do not include continuous felloe portions, but instead, the rim or rims are mounted directly upon the ends of the wheel spokes. It will be recognized that my invention is particularly adapted to be used with wheels in which the brackets can be mounted directly upon the ends of the spokes, all as will be completely evident to those skilled in the art.

While in accordance with the patent statutes I have specifically illustrated and described my invention it should be definitely understood that I am not to be limited thereto or thereby, but that the scope of my invention is defined in the appended claims.

I claim:

1. A wheel and rim assembly including a wheel felloe, a plurality of brackets, bolt means removably securing the brackets directly to the wheel felloe at circumferentially spaced points, an endless band positioned concentrically of and spaced directly radially of the wheel felloe and secured to the brackets, and a pair of rims removably mounted on and carried by the brackets in spaced relation thereon, said rims being positioned concentrically of and spaced from the endless band.

2. A wheel and rim assembly including a wheel felloe, a plurality of brackets, bolt means removably securing the brackets to the wheel felloe at circumferentially spaced points, an endless band positioned concentrically of the wheel felloe, rivet means securing the band to the radially inner surface of the brackets, and a rim mounted on and carried by the brackets, said band being spaced from the wheel felloe and the rim and engaging only with the brackets.

3. A wheel and rim assembly including a wheel, a plurality of brackets each having a radially-inwardly extending flange positioned off-center of the bracket and adapted to engage in mounting relation with either the inboard or the outboard side of the wheel, integral radially-outwardly extending flanges adjacent each end of each bracket, a relatively narrow, radially thin, substantially cylindrical endless band adapted to be positioned concentric of the wheel but spaced radially outwardly therefrom, means securing the brackets to the band at circumferentially-spaced points thereon, means releasably securing the brackets by their radially inwardly extending flanges to the wheel, a pair of rims, radially-inwardly extending lug means on each rim, and means releasably securing the lug means to either side of the radially-outwardly extending flanges on the brackets.

4. A wheel and rim assembly including a wheel, a plurality of brackets each having a radially-inwardly extending flange adapted to engage in mounting relation with the wheel, a relatively narrow endless band adapted to be positioned concentric of the wheel, means securing the brackets to the band at circumferentially-spaced points thereon, means releasably securing the brackets by their radially inwardly extending flanges to the wheel, a pair of rims, and separate means releasably securing both rims to each one of the brackets.

5. A wheel and rim assembly including a wheel, a plurality of brackets each having a radially-inwardly extending flange adapted to engage in mounting relation with the wheel, a relatively narrow cylindrical endless band of uniform radial dimensions and thickness adapted to be positioned concentric of the wheel, means securing the brackets to the band at circumferentially-spaced points thereon, means releasably securing the brackets by their radially inwardly extending flanges to the wheel, a rim, and means releasably securing the rim to the brackets.

6. In combination, a wheel, a pair of rims, a plurality of brackets extending directly between the wheel and the rims for securing the rims in spaced relation on the wheel, and an endless band secured to the brackets and holding them in circumferentially-spaced relation.

ALVA W. WOODWARD.